(12) United States Patent
Henson, III

(10) Patent No.: US 7,793,886 B2
(45) Date of Patent: Sep. 14, 2010

(54) JET AIR RECOVERY GENERATOR AND JET BLAST DEFLECTOR

(76) Inventor: George A. Henson, III, 328 Rockledge La., Manitou Springs, CO (US) 80829

( * ) Notice: Subject to any disclaimer, the term of this patent is extended or adjusted under 35 U.S.C. 154(b) by 147 days.

(21) Appl. No.: 12/319,959

(22) Filed: Jan. 14, 2009

(65) Prior Publication Data
US 2010/0176599 A1 Jul. 15, 2010

(51) Int. Cl.
*B64F 1/00* (2006.01)
(52) U.S. Cl. .................................. 244/114 B; 181/210
(58) Field of Classification Search ............. 244/114 B, 244/1 R, 1 N; 181/210; 52/84, 245; 89/36.02
See application file for complete search history.

(56) References Cited

U.S. PATENT DOCUMENTS

| | | | |
|---|---|---|---|
| 3,010,684 A * | 11/1961 | Phillips et al. .......... | 244/114 B |
| 3,797,787 A * | 3/1974 | Watanabe ................ | 244/114 B |
| 7,380,751 B1 * | 6/2008 | Henson ................... | 244/114 B |
| 7,437,987 B1 * | 10/2008 | Ohnstad et al. ............ | 89/36.04 |

\* cited by examiner

*Primary Examiner*—J. Woodrow Eldred
(74) *Attorney, Agent, or Firm*—G. F. Gallinger

(57) ABSTRACT

A combination of an air recovery generator and blast deflector for generating energy on the ground from horizontally discharged air from an aircraft on the ground and for deflecting the discharged air upwardly comprising: a) a laterally elongate frame having a sloping front face covered with a skin, so that air horizontally discharged against the face will be diverted upwardly enhancing comfort and safety for people on the ground; and, b) a pivoted bladed wheel attached to, and positioned in front of the frame, so that the horizontally discharged air will rotate the wheel thereby generating electricity when the discharged air is upwardly deflected. A method of generating electrical power from air discharged from an aircraft on the ground comprises the steps of: a) providing an air recovery generator having, i) a base, ii) a cylindrical bladed wheel pivotably attached to the base, and iii) a generator turned by the bladed wheel to thereby generate power; and, b) positioning the air recovery generator immediately in front of a blast deflector having an elongate sloping front face, so that the horizontally discharged air will rotate the wheel thereby generating electricity before the discharged air is upwardly deflected.

17 Claims, 2 Drawing Sheets

JET AIR RECOVERY GENERATOR AND JET BLAST DEFLECTOR

PRIOR APPLICATION

The inventor herein, George A. Henson III was issued U.S. Pat. No. 7,380,751 on Jun. 3, 2008 for a Jet Air Recovery Generator. This specification adapts the apparatus therein and discloses a method wherein the jet air recovery generator is used in conjunction with a blast deflector.

FIELD OF THE INVENTION

This invention relates to energy recovery from wind. More particularly this invention relates to an apparatus and method for recovering energy, and diverting the blast from discharged engine air when jets are tested or takeoff at an airport.

BACKGROUND OF THE INVENTION

Commercial jets cruise at air speeds exceeding 500 mph. At takeoff air discharged from their engines has speeds exceeding 300 mph. The speed of this discharged air is greatest immediately behind the engines. At one end of the runway prior to take off pilots usually accelerate their engines to full power with their wheel brakes engaged in order to achieve maximum air speed at the other end of the runway in order to lift off. This engine accelerating position for take off is generally the same for all planes taking off. Immediately behind this accelerating position on the runway air is discharged at speeds exceeding 300 mph. This high velocity air exerts tremendous force and contains much inherent power.

Passengers and service personnel at an airport need to be protected from the direct force of air discharged from jet engines. Blast deflectors are used to protect individuals from this discharged air. Typically blast deflectors deflect laterally moving air upwardly so that individuals can safely pass behind these barriers. When an air recovery generator is used in conjunction with a blast deflector the discharged air is slowed as it imparts energy to the air recovery generator before it is finally diverted upwardly.

OBJECTS OF THE INVENTION

It is an object of this invention to disclose an apparatus and method for capturing energy contained within air discharged from a jet engine before diverting this air upwardly for the safety of individuals in the immediate vicinity. It is an object of this invention to disclose a simple apparatus which will generate substantial power from air discharged from an aircraft before diverting that air upwardly for the safety of individuals. It is yet a further object of this invention to disclose a portable apparatus which may be positioned immediately in front of an existing blast deflector to recover power from the air deflected thereby. It is a final object of this invention to disclose a power generation apparatus which replaces a linear section of a blast deflector so that in addition to deflecting the blast of the discharged air, power is recovered therefrom.

One aspect of this invention provides for a combination of an air recovery generator and blast deflector for generating energy on the ground from horizontally discharged air from an aircraft on the ground and for deflecting the discharged air upwardly comprising: a) a laterally elongate frame having a sloping front face covered with a skin, so that air horizontally discharged against the face will be diverted upwardly enhancing comfort and safety for people on the ground; and, b) a pivoted bladed wheel attached to, and positioned in front of the frame, so that the horizontally discharged air will rotate the wheel thereby generating electricity when the discharged air is upwardly deflected.

Another aspect of this invention provides for a method of generating electrical power from air discharged from a landed aircraft comprising the steps of: a) providing a combination of an air recovery generator and blast deflector as above; b) positioning the front side of the sloping surface facing inwardly to and around the perimeter of an airfield so that the discharged air is directed upwardly and thereby rotates the bladed wheel and generates electricity.

In yet another preferred aspect of this invention a method of generating electrical power from air discharged from an aircraft on the ground comprises the steps of: a) providing an air recovery generator having, i) a base, ii) a cylindrical bladed wheel pivotably attached to the base, and iii) a generator turned by the bladed wheel to thereby generate power; and, b) positioning the air recovery generator immediately in front of a blast deflector having an elongate sloping front face, so that the horizontally discharged air will rotate the wheel thereby generating electricity before the discharged air is upwardly deflected.

Various other objects, advantages and features of this invention will become apparent to those skilled in the art from the following description in conjunction with the accompanying drawings.

FIGURES OF THE INVENTION

Figure 1:
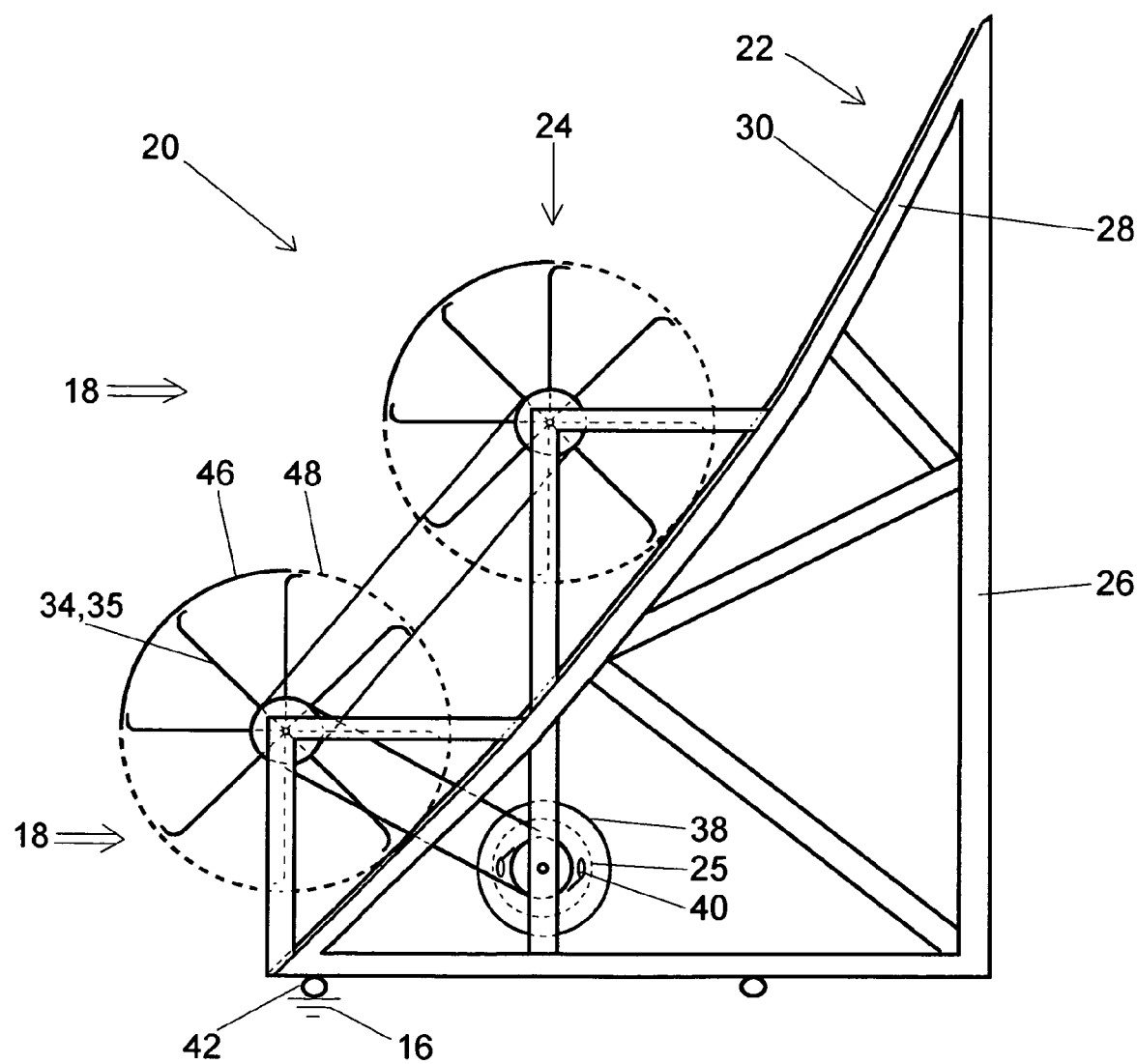
FIG. 1 is a schematic elevational drawing of a combination of a jet air recovery generator incorporated into a linear section of a blast deflector.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have an schematic elevational drawing of a combination 20 of a jet air recovery generator 24 incorporated into a linear section of a blast deflector 22. Most generally the combination 20 of an air recovery generator 24 and blast deflector 22 for generating energy on the ground from horizontally air 18 discharged from an aircraft on the ground and for deflecting the discharged air 18 upwardly comprises: a) a laterally elongate frame 26 having a sloping front face 28 covered with a skin 30, so that air horizontally discharged against the face 30 will be diverted upwardly enhancing comfort and safety for people on the ground; and, b) a pivoted bladed wheel 34 positioned in front of the front face 28 of the frame 26, so that the horizontally discharged air 18 will rotate the wheel 34 thereby generating electricity when the discharged air 18 is upwardly deflected. In the most preferred embodiment of the invention the bladed wheel 34 is pivotably attached to, and positioned in front of the frame 26.

Most preferably the bladed wheel 34 comprises a bladed cylinder wheel 35. The bladed cylindrical wheel 35 rotates a flywheel 38 to store rotational energy therein. A governor/clutch assembly 40 may be included to limit the speed of the bladed cylindrical wheel 35. The flywheel 38 and governor/ clutch assembly may be positioned on the shaft of the electrical generator 25. In a preferred embodiment of the invention, multiple bladed cylindrical wheels 34 are provided to better recover energy from the discharged air 18.

Most preferably lifting/removable wheels 42 are provided to facilitate movement and ensure that in an operational position the frame 26 rests on the ground. Most preferably a front top portion of the bladed cylindrical wheel 34 is covered by a solid baffle 46 to facilitate maximal forward rotation and wherein the uncovered portions of the cylindrical wheel 34 are covered by a safety screen 48. In the most preferred embodiment of the invention the frame 26 thereof has a generally rectangular footprint so that similar jet recovery apparatuses 20 may be linearly positioned end to end to protect the periphery of an airfield.

Most generally, a method of generating electrical power from air 18 discharged from an aircraft on the ground comprises the steps of: a) providing a combination 20 of an air recovery generator 24 and blast deflector 22 as described above; and, b) positioning the air 118 is directed upwardly and thereby rotates the bladed wheel 34 and generates electricity. This general method may be limited with the same apparatus limitations as described above.

Figure 2:
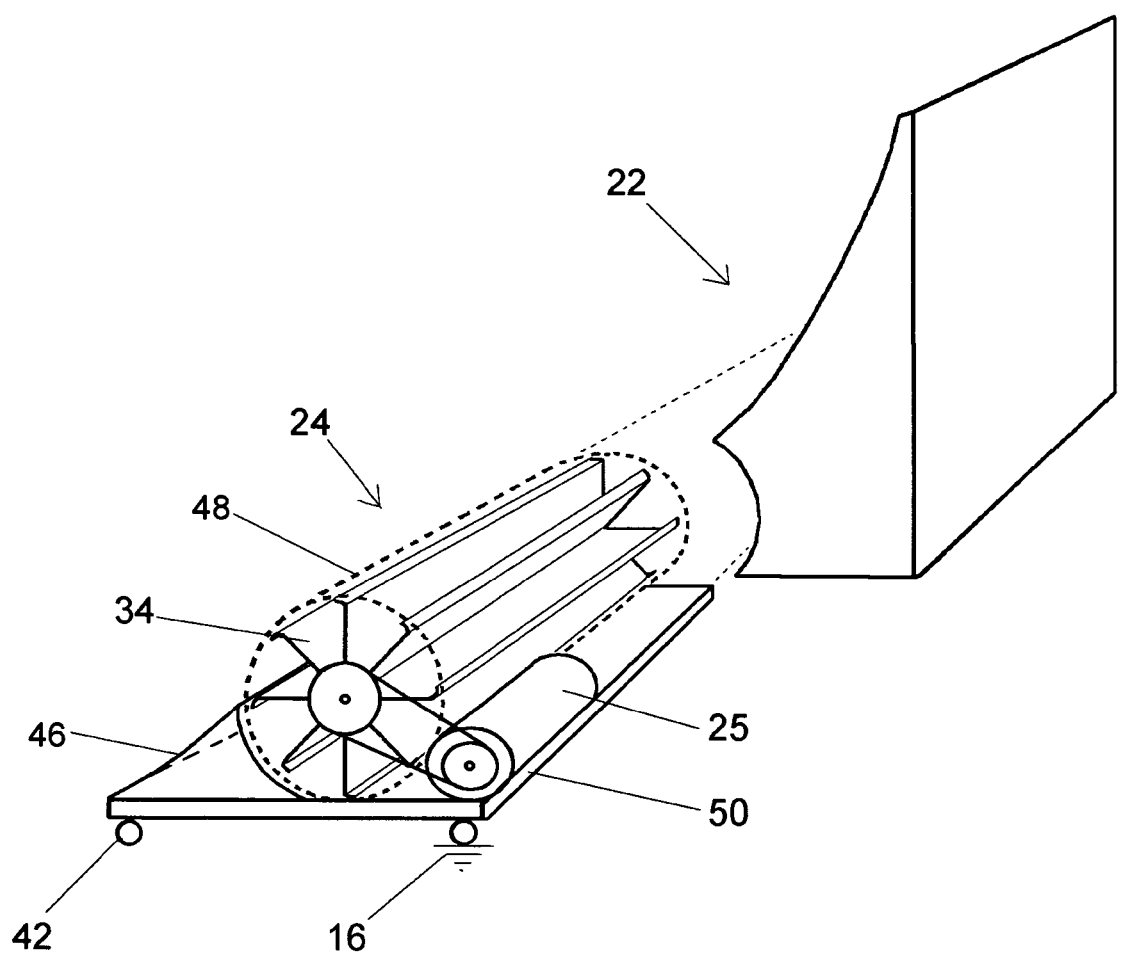
FIG. 2 is a schematic perspective drawing of a portable jet air recovery apparatus for use in front of a blast deflector.

FIG. 2 is a schematic perspective drawing of a portable jet air recovery generator 24 for use in front of a blast deflector 22. A method of generating electrical power from air 18 discharged from an aircraft on the ground comprising the steps of: a) providing an air recovery generator 24 havixig, i) a base 50, ii) a cylindrical bladed wheel 34 pivotably attached to the base 50, and iii) an electrical generator 25 turned by the bladed wheel 34 to thereby generate power; and, b) positioning the air recovery generator 24 immediately in front of a blast deflector 22 having an elongate sloping front face 28, so that the horizontally discharged air 18 will rotate the wheel 34 thereby generating electricity before the discharged air 18 is upwardly deflected.

If the base has upwardly retractablef removable wheels 42 then the air recovery generator 24 can be first rolled into position and thereafter seated directly on the ground 16 for operation. Most preferably the blast deflector 22 and the air recovery generator 24 are matingly configured to be positioned and function immediately adjacent to each other.

While the invention has been described with preferred specific embodiments thereof, it will be understood that this description is intended to illustrate and not to limit the scope of the invention, which is defined by the following claims.

I claim:

1. A combination of an air recovery generator and blast deflector for generating energy on the ground from horizontally discharged air from an aircraft on the ground and for deflecting the discharged air upwardly comprising:
   a) a laterally elongate frame having a sloping front face covered with a skin, so that air horizontally discharged against the face will be diverted upwardly enhancing comfort and safety for people on the ground; and,
   b) a pivoted bladed wheel positioned in front of the front face of the frame, so that the horizontally discharged air will rotate the wheel thereby generating electricity when the discharged air is upwardly deflected.

2. The combination of an air recovery generator and blast deflector as in claim 1, wherein the bladed wheel is pivotably attached to, and positioned in front of the frame.

3. The combination of an air recovery generator and blast deflector as in claim 2 wherein the bladed wheel comprises a bladed cylinder wheel.

4. The combination of an air recovery generator and blast deflector as in claim 3 wherein the bladed cylindrical wheel rotates a flywheel to store rotational energy therein.

5. The combination of an air recovery generator and blast deflector as in claim 4 further comprising a governor/clutch assembly to limit the speed of the bladed cylindrical wheel.

6. The combination of an air recovery generator and blast deflector as in claim 4 further comprising multiple bladed cylindrical wheels to better recover energy from the discharged air.

7. The combination of an air recovery generator and blast deflector as in claim 4 further comprising lifting/removable wheels to facilitate movement and ensure that in an operational position the frame rests on the ground.

8. The combination of an air recovery generator and blast deflector as in claim 4 wherein a front top portion of the bladed cylindrical wheel is covered by a solid baffle to facilitate maximal forward rotation and wherein the uncovered portions of the cylindrical wheel are covered by a safety screen.

9. The combination of an air recovery generator and blast deflector as in claim 4 wherein the frame thereof has a generally rectangular footprint so that similar combinations of air recovery generators and blast deflectors may be linearly positioned end to end to protect the periphery of an airfield.

10. A method of generating electrical power from air discharged from an aircraft on the ground comprises the steps of:
    a) providing a combination of an air recovery generator and blast deflector as described in claim 2;
    b) positioning the front side of the sloping surface facing inwardly to and around the perimeter of an airfield so that the discharged air is directed upwardly and thereby rotates the bladed wheel and generates electricity.

11. A method as in claim 10 wherein the bladed wheel comprises a bladed cylinder wheel.

12. A method as in claim 11 wherein the bladed cylindrical wheel rotates a flywheel to store rotational energy therein.

13. A method as in claim 12 further comprising a governor/clutch assembly to limit the speed of the bladed cylindrical wheel.

14. A method as in claim 12 further comprising multiple bladed cylindrical wheels to better recover energy from the discharged air.

15. A method as in claim 12 further comprising lifting/removable wheels to facilitate movement and ensure that in an operational position the frame rests on the ground.

16. A method as in claim 12 wherein a front top portion of the bladed cylindrical wheel is covered by a solid baffle to facilitate maximal forward rotation and wherein the uncovered portions of the cylindrical wheel are covered by a safety screen.

17. A method as in claim 12 wherein the frame thereof has a generally rectangular footprint so that similar units may be linearly positioned end to end to protect the periphery of an airfield.

* * * * *